United States Patent
Mangalik et al.

(10) Patent No.: US 11,669,853 B2
(45) Date of Patent: Jun. 6, 2023

(54) DISTANCE POINTS INTERACTIVE INTERFACE AND RELATED METHODS

(71) Applicant: Capital One Services, LLC, McLean, VA (US)

(72) Inventors: Siddharth Mangalik, Stony Brook, NY (US); Brian Lin, Henrico, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/156,823

(22) Filed: Jan. 25, 2021

(65) Prior Publication Data

US 2022/0237645 A1 Jul. 28, 2022

(51) Int. Cl.
*G06Q 30/00* (2023.01)
*G06Q 30/0226* (2023.01)
(Continued)

(52) U.S. Cl.
CPC ......... *G06Q 30/0226* (2013.01); *G06F 9/451* (2018.02); *G06F 16/29* (2019.01); *G06F 16/9017* (2019.01); *G06F 16/9535* (2019.01); *G06F 16/9537* (2019.01); *G06F 16/9538* (2019.01); *G06Q 30/0224* (2013.01)

(58) Field of Classification Search
CPC ........... G06Q 30/0224; G06Q 30/0226; G06Q 30/0261; G06Q 30/0266; G06Q 30/0267; G06F 16/9017; G06F 16/9535; G06F 16/9537

See application file for complete search history.

(56) References Cited

U.S. PATENT DOCUMENTS 7,890,367 B2 * 2/2011 Senghore ............. G06Q 20/208
  705/14.3
8,566,151 B2 * 10/2013 Baggett .................. G06Q 10/02
  705/14.1

(Continued)

OTHER PUBLICATIONS

Choudhury, Munmun, et al. "Automatic Construction of Travel Itineraries using Social Breadcrumbs." HT2010, Jun. 13-16, 2010, Toronto, Ontario. (Year: 2010).*

(Continued)

*Primary Examiner* — Luis A Brown
(74) *Attorney, Agent, or Firm* — Bookoff McAndrews, PLLC

(57) ABSTRACT

A computer-implemented method includes determining a number of distance points connected to a person at a point in time, scraping a plurality of indexes corresponding to a respective plurality of journey hosts to identify a plurality of journey possibilities for each journey host of the plurality of journey hosts, generating a plurality of reachable locations based on the number of distance points and the journey possibilities, the plurality of reachable locations comprising at least a subset of the plurality of journey possibilities correlated to the number of distance points, receiving location signals generated via a location sensor of a device associated with the person, identifying one or more previous locations of the device based on the location signals, identifying a subset of the reachable locations based on the previous locations of the device, and generating a graphical interface to visually display the subset of the reachable locations on a map.

11 Claims, 10 Drawing Sheets

(51) Int. Cl.
   *G06F 16/29*     (2019.01)
   *G06F 16/9537*   (2019.01)
   *G06F 9/451*     (2018.01)
   *G06F 16/9538*   (2019.01)
   *G06F 16/9535*   (2019.01)
   *G06Q 30/0207*   (2023.01)
   *G06F 16/901*    (2019.01)

(56) References Cited

U.S. PATENT DOCUMENTS

| | | | | |
|---|---|---|---|---|
| 8,615,425 | B2* | 12/2013 | Baggett | G06Q 10/02 705/14.1 |
| 8,626,194 | B2* | 1/2014 | Busch | G06Q 30/0282 455/456.1 |
| 9,471,926 | B2 | 10/2016 | Clyne | |
| 11,188,940 | B1* | 11/2021 | Vanderveld | G06N 20/00 |
| 11,461,793 | B2* | 10/2022 | Harris | G06Q 30/0204 |
| 2005/0086103 | A1* | 4/2005 | Agura | G06Q 30/02 705/26.1 |
| 2006/0053052 | A1* | 3/2006 | Baggett | G06Q 30/0233 705/5 |
| 2007/0143155 | A1* | 6/2007 | Whitsett | G06Q 10/02 705/5 |
| 2008/0027767 | A1* | 1/2008 | Gunn | G06Q 30/06 705/5 |
| 2008/0040167 | A1* | 2/2008 | Ackerman | G06Q 10/02 705/5 |
| 2009/0192917 | A1* | 7/2009 | Wolkin | G06Q 30/0601 705/26.1 |
| 2009/0287408 | A1* | 11/2009 | Gerdes | G01C 21/3423 701/533 |
| 2012/0259669 | A1* | 10/2012 | Stilwell | G06Q 10/02 705/5 |
| 2012/0290380 | A1* | 11/2012 | Paul | G06Q 30/0226 705/14.33 |
| 2013/0117109 | A1* | 5/2013 | Busch | G06Q 30/0255 455/456.3 |
| 2013/0173371 | A1* | 7/2013 | Krolick | G06Q 50/30 705/14.23 |
| 2013/0268886 | A1* | 10/2013 | Sureshkumar | G06F 3/04842 715/810 |
| 2013/0304526 | A1* | 11/2013 | Boyd | G06Q 10/02 705/5 |
| 2015/0356446 | A1* | 12/2015 | Greystoke | G06Q 30/0282 706/11 |
| 2016/0078465 | A1* | 3/2016 | Chai | H04N 21/4784 705/14.27 |
| 2016/0371799 | A1* | 12/2016 | Miller | G06Q 30/0226 |
| 2017/0046692 | A1* | 2/2017 | Borgmeyer | G06Q 30/0233 |
| 2017/0193614 | A1* | 7/2017 | Kalyanaraman | G06Q 50/14 |
| 2017/0293665 | A1* | 10/2017 | Brodziak | G06F 16/24575 |
| 2018/0341971 | A1* | 11/2018 | Shah | G06Q 30/0229 |
| 2020/0027378 | A1* | 1/2020 | Castet | B64D 43/00 |

OTHER PUBLICATIONS

Airan, Ali, etal. "Characterizing Activity Patterns Using Co-Clustering and User-Activity Network." 2017 IEEE International Conference on Intelligent Transportation Systems, 2017. (Year: 2017).*

Yin, Hongzhi, et al. "Spatial-Aware Hierarchical Collaborative Deep Learning for POI Recommendation." IEEE Transactions on Knowledge and Data Engineering, vol. 29, No. 11, Nov. 2017. (Year: 2017).*

Yu, Zhiwen, et al. "Personalized Travel Package with Multi-Point-of-Interest Recommendation Based on Crowdsourced User Footprints." IEEE Transactions on Human Machine Systems, vol. 46, No. 1, Feb. 2016. (Year: 2016).* https://www.aa.com/awardMap/home.do.

* cited by examiner

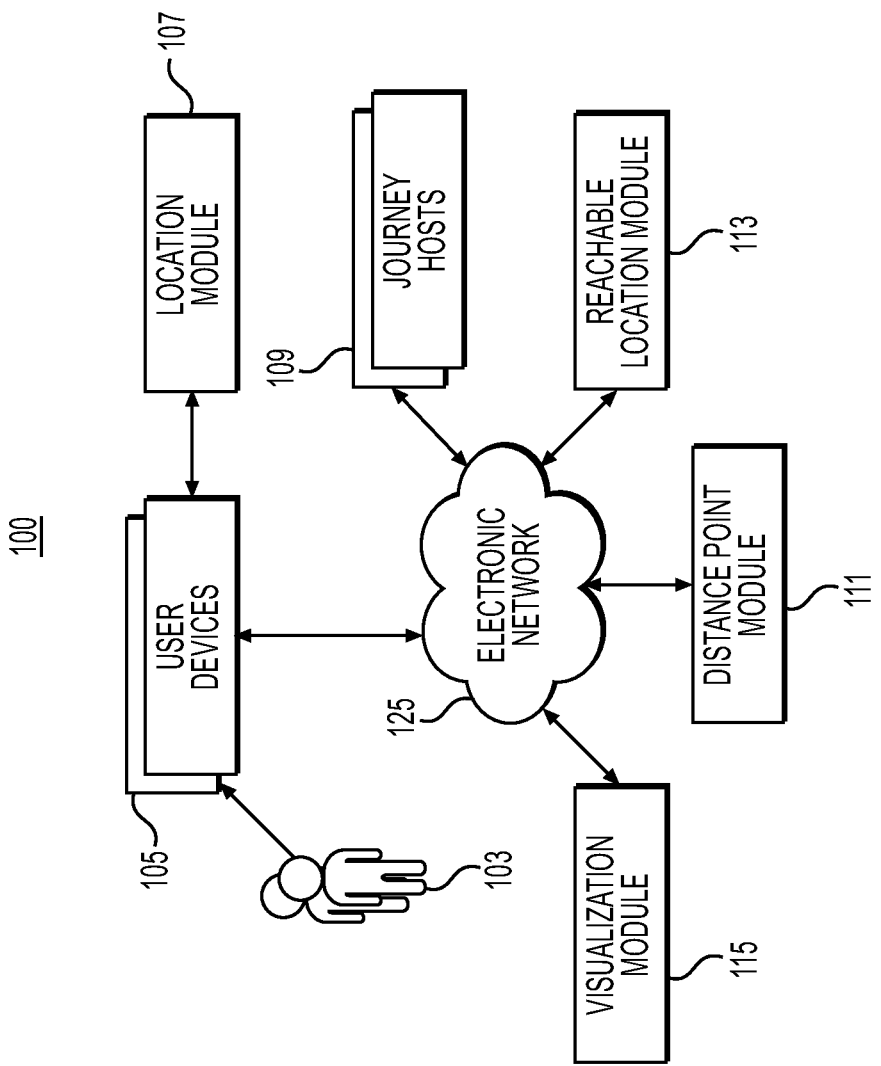

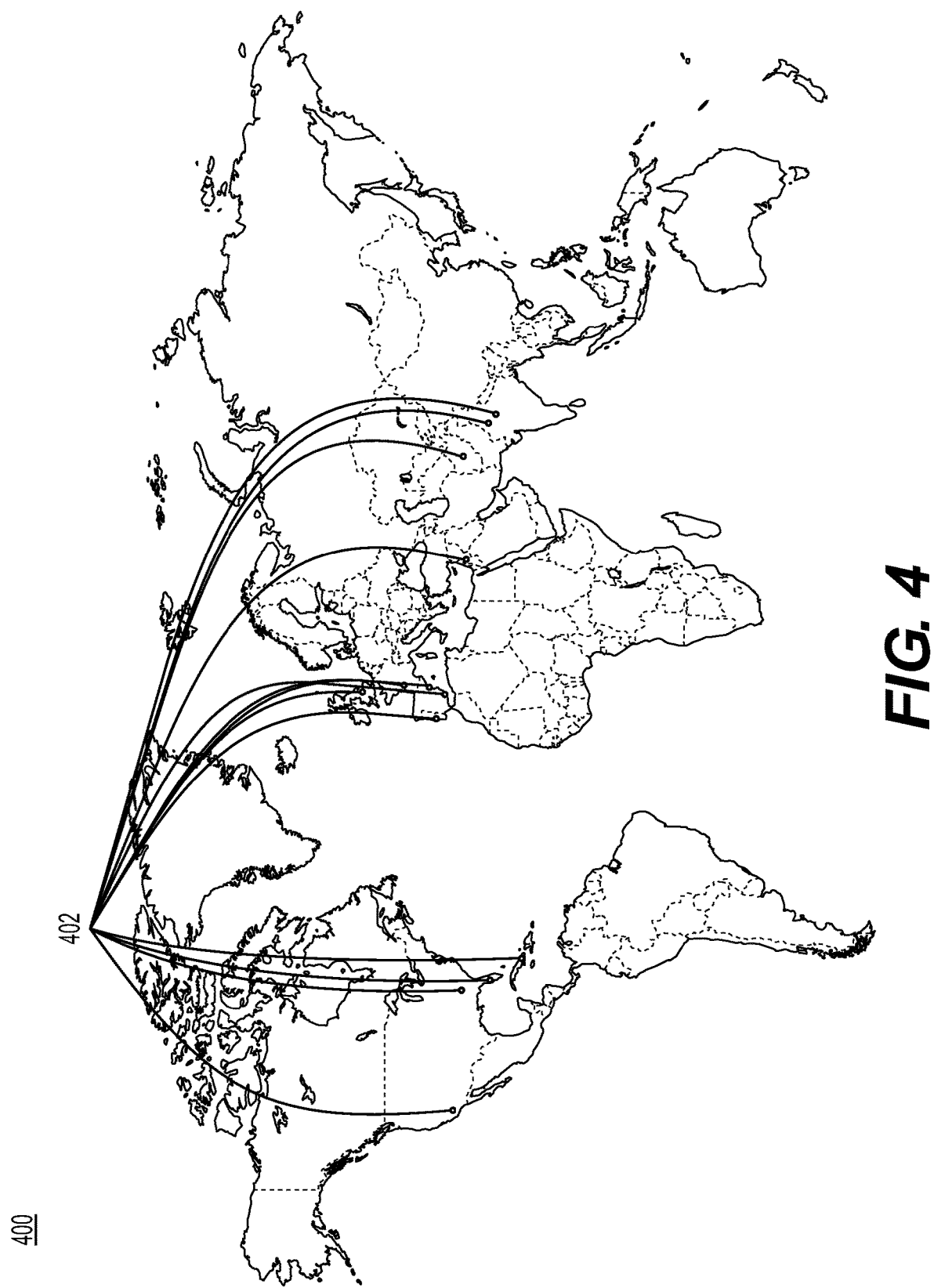

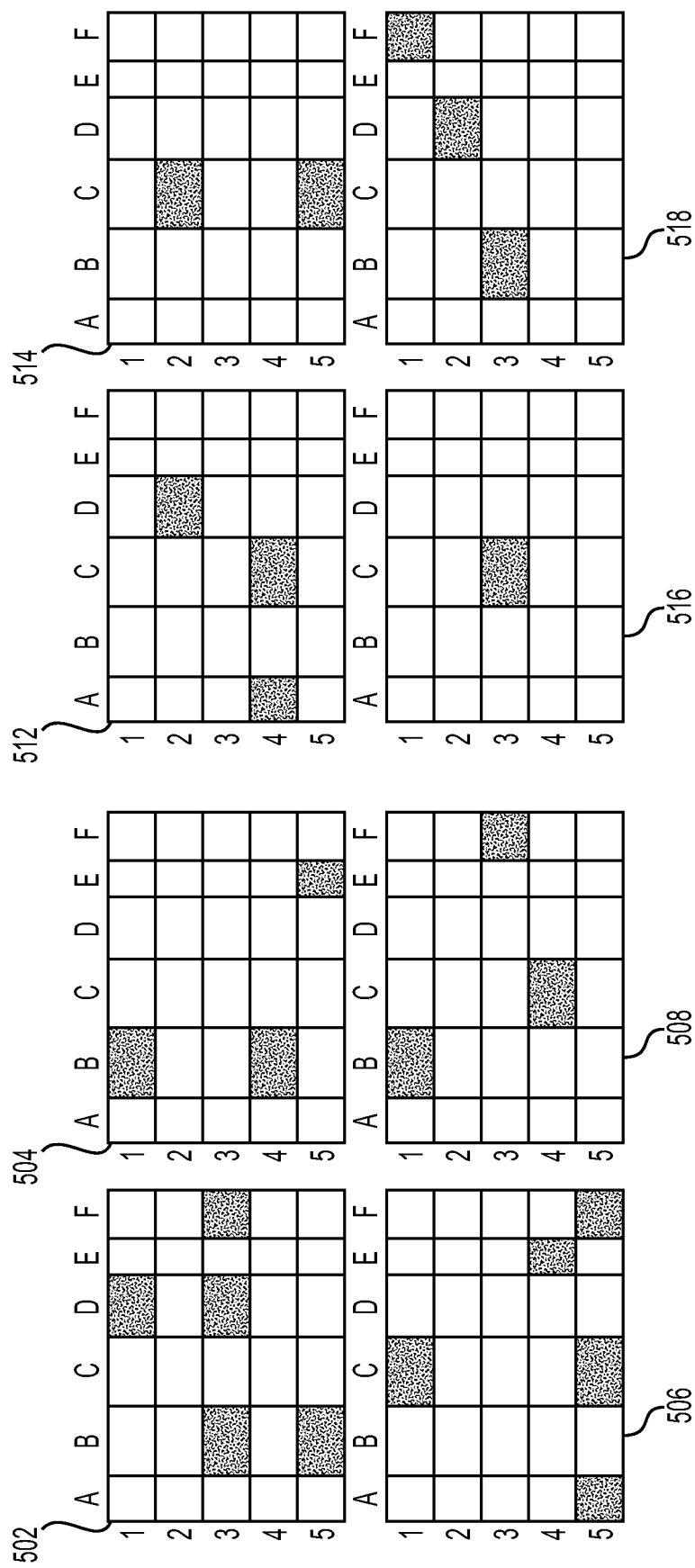

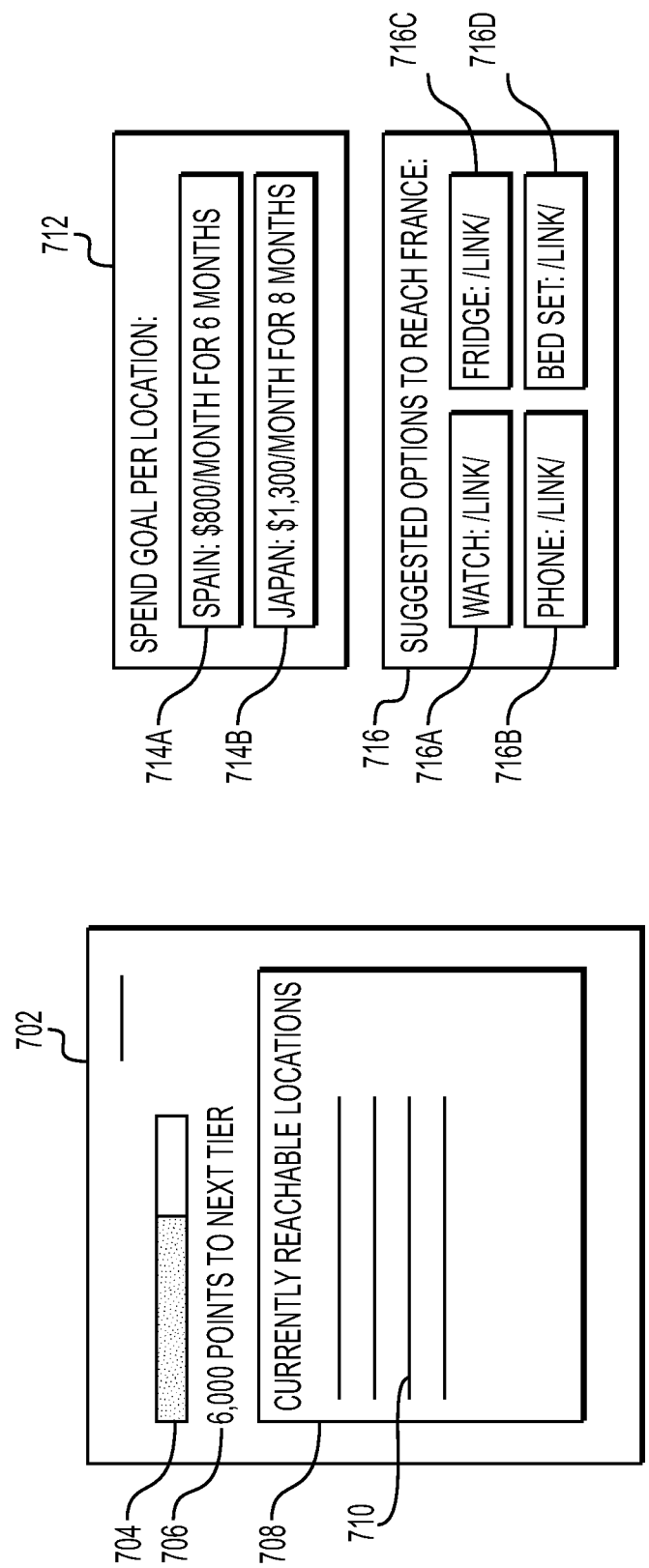

DISTANCE POINTS INTERACTIVE INTERFACE AND RELATED METHODS

TECHNICAL FIELD

Various embodiments of the present disclosure relate generally to generating graphical interfaces using distance points based reachable locations, and more particularly, systems and methods for signal interpretation, extracting locations, and/or generating graphical interfaces.

BACKGROUND

Distance-based points such as airline points, credit card points, and the like are generally implemented in a complex manner. It is often difficult for consumers to ascertain the possible uses and/or value of their points. Such consumers encounter significant difficulty in redeeming distance-based points due to convoluted award miles charts, unclear restrictions, and the like. Additionally, consumers often have to sort through a large number of travel possibilities and find it difficult to select one or a few potential travel destinations and/or to compare potential opportunities. It is also often difficult for consumers to ascertain the value of points and, thus, consumer participation in points based programs is reduced.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining a number of distance points connected to a person at a point in time, scraping a plurality of indexes corresponding to a respective plurality of journey hosts to identify a plurality of journey possibilities for each journey host of the plurality of journey hosts, generating a plurality of reachable locations based on the number of distance points and the journey possibilities, the plurality of reachable locations comprising at least a subset of the plurality of journey possibilities correlated to the number of distance points, receiving location signals generated via a location sensor of a device associated with the person, identifying one or more previous locations of the device based on the location signals, identifying a subset of the reachable locations based on the previous locations of the device, and generating a graphical interface to visually display the subset of the reachable locations on a map.

In another aspect, an exemplary embodiment of a computer-implemented method includes determining a number of distance points connected to a person at a point in time, scraping a plurality of indexes corresponding to a respective plurality of journey hosts to identify a plurality of journey possibilities for each journey host of the plurality of hosts, generating a plurality of reachable locations based on the number of distance points and the journey possibilities, the plurality of reachable locations comprising at least a subset of the plurality of journey possibilities correlated to the number of distance points, receiving transactional data connected to the person, determining one or more personal attributes based on the transactional data, identifying one or more future locations for the person based on the personal attributes, identifying a subset of the reachable locations that overlap the one or more future locations, and generating a graphical interface to visually display the subset of the reachable locations on a map.

In another aspect, a data storage device storing processor-readable instructions and a processor operatively connected to the data storage device and configured to execute the instructions to perform operations that include determining a number of distance points connected to a person at a point in time, scraping a plurality of indexes corresponding to a respective plurality of journey hosts to identify a plurality of journey possibilities for each journey host of the plurality of hosts, generating a plurality of reachable locations based on the number of distance points and the journey possibilities, the plurality of reachable locations comprising at least a subset of the plurality of journey possibilities correlated to the number of distance points, determining one or more personal attributes, identifying one or more future locations for the person based on the personal attributes identifying a subset of the reachable locations that overlap the one or more future locations and providing the subset of the reachable locations.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts an exemplary computing environment for generating graphical interfaces, according to one or more embodiments.

FIG. 4 depicts an exemplary world map based on previous locations, according to one or more embodiments.

FIG. 5A depicts another exemplary location matrix, according to one or more embodiments.

FIG. 5B depicts another exemplary location matrix, according to one or more embodiments.

FIG. 7A depicts an example interface, according to one or more embodiments.

FIG. 7B depicts another example interface, according to one or more embodiments.

Like reference numbers and designations in the various drawings indicate like elements.

DETAILED DESCRIPTION OF EMBODIMENTS

Figure 2A:
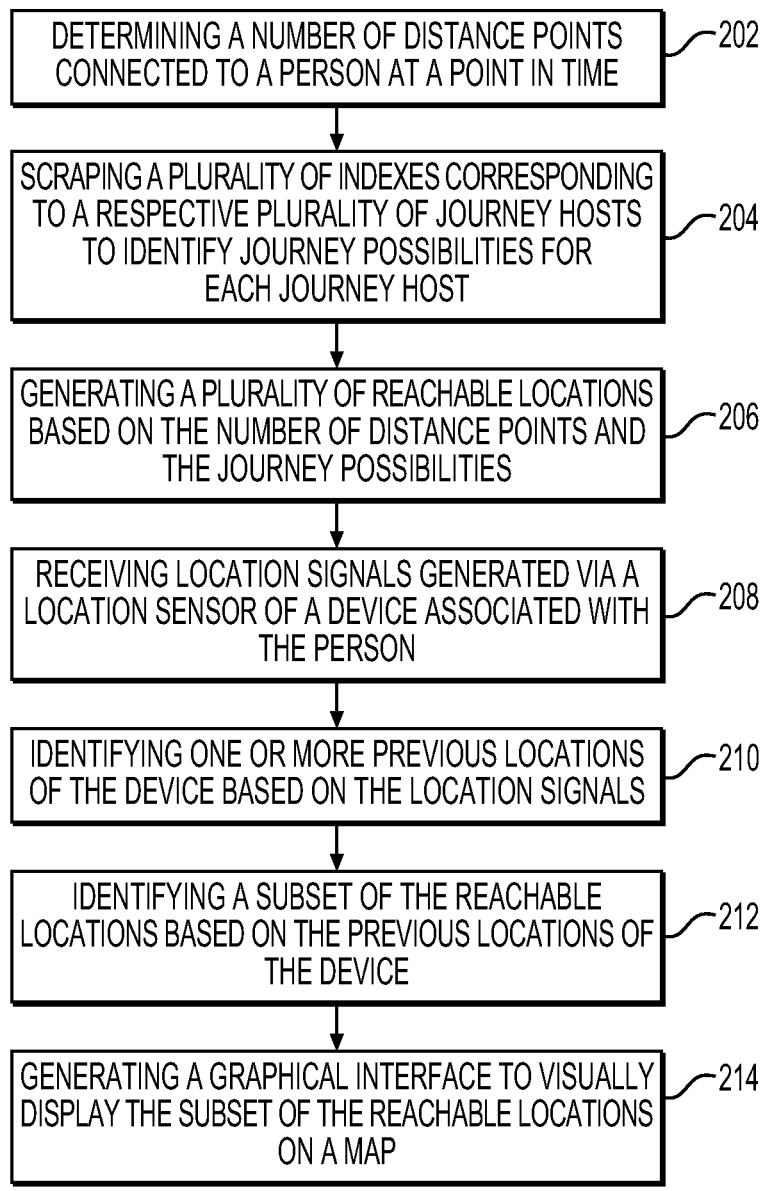
FIG. 2A depicts a flowchart of an exemplary method for generating a graphical interface to display a subset of reachable locations, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, "distance points" may refer to one or more of travel points, credit card points, reward points, transactional points, or the like. Distance points may be accumulated based on one or more of past travel, expenditures for purchase of goods and/or services, use of a credit card, points awarded for sale of goods or services, points received as part of a promotion (e.g., a large sign-on bonus to attract new customers), or the like. The distance points may be used for any applicable purpose such as for travel, for procuring goods or services, for payment or reduction of a bill, to obtain a discount, or the like.

As used herein, a "journey host" may refer to an entity or individual that can facilitate travel based on distance points or a conversion or calculation conducted based on distance points. For example, a journey host may include one or more travel partners, airlines, travel coordinators, travel agencies, or the like.

As used herein, "journey possibilities" may be possible destinations that can be reached by a person based on one or more filter criteria, as further disclosed herein. For example, a journey possibility may be a destination that is reachable based on a number of distance points, is reachable based on airline travel schedules, is reachable based on available seats, class of travel (e.g., business class, first class, economy class, etc.), or the like.

A journey host may store, communicate, or allocate journey possibilities using one or more indexes. Each journey host of a plurality of journey hosts may utilize its own index such that each journey host's index corresponds to journey possibilities that can be fulfilled by that journey host. The index may also include additional information such as cost (e.g., in distance points, monetary cost, etc.), number of passengers, lay-overs, durations, timings, stipulations, or the like.

According to implementations of the disclosed subject matter, a number of distance points connected to a person at a point of time may be determined. The person may be any individual, group, account, or entity that can accumulate distance points, and may be a human, a group of individuals, or a business. Although this disclosure is generally directed to distance points being associated with a person, it will be understood that a person may be an individual, group, entity, or account. Distance points associated with a person may be accumulated over time, in batches, or as a lump sum. The number of distance points connected to a person may be stored in a cloud based storage system and may be provided to the person using a graphical interface (e.g., a mobile application, a website, etc.).

A plurality of indexes corresponding to a respective plurality of journey hosts may be scrapped to identify a plurality of journey possibilities (e.g., destinations, routes, etc.) for each journey host of the plurality of journey hosts. The indexes may be publically available or may be available to travel partners (e.g., to a processing partner that enables use of distance points). The plurality of indexes may be available via cloud interfaces or may be provided to scrapping tools, bots, servers, or the like via a network connection. The journey possibilities may include all destinations that a corresponding journey host can facilitate and may be pre-filtered or otherwise filtered based on one or more filter criteria (e.g., passenger number, class designation, journey time, journey duration, number of stops, etc.).

A plurality of reachable locations based on the number of distance points connected to a person and the journey possibilities may be generated. The reachable locations may be locations or travel routes that at least one journey host can facilitate for the number of distance points connected to a given person. For example, the journey possibilities may include fifteen countries but twelve of the fifteen countries may not be reachable based on the number of distance points connected to a given person. Accordingly, the reachable locations may include the three countries that are indicated as journey possibilities by the journey hosts and that can be reached using the number of distance points associated with the user.

A location sensor of a user device may generate location signals. The user device may be a mobile device, computer, wearable device, or the like and may generate the location signals periodically or at pre-set intervals. The location signals may indicate the location of the user device and, presumably, of the person (e.g., user) associated with the user device. The location signals may be stored such that the location of the user device over a period of time may be accessible. The location signals may be stored via a cloud storage component and may be provided by a first device at a first time and a second device at a second time. For example, location signals may be stored from a mobile phone with a location sensor at the first time. The person to whom the mobile phone belongs to may upgrade or otherwise replace her phone and, thus, location signals may be stored from the upgraded or new mobile phone with a location sensor at the second time. The two locations may be associated with the same person.

One or more previous locations of the device may be identified based on the location signals. Although a single device is exemplified herein for simplicity, as disclosed, the device may correspond to multiple devices. The previous locations may be stored as global positioning system (GPS) coordinates, other coordinates, country, state, city, street, town, region, elevation, or the like or a combination thereof.

A subset of the reachable locations may be identified based on the previous locations of the device and a graphical interface may be generated to visually display the subset of the visual locations on a map. The subset of the reachable locations may be locations that were, for example, frequently visited, frequently visited at a given time of year/month/week, infrequently visited, or never visited. As an example, the subset of reachable locations may be locations that a person may want to visit since the person has never visited the subset of reachable locations before.

Similarly, transactional data connected to a person may be received. The transactional data may be any applicable transactional data such as credit card data, debit card data, online transactions, in person transactions, goods or services purchased, times of transactions, or the like. One or more personal attributes may be determined based on the transactional data. The one or more personal attributes may indicate the given person's likes, dislikes, preferences, hobbies, travel preferences, past travel, cultural attributes, economic attributes, or the like. For example, a person's transactional data may indicate that the person enjoys French food (e.g., based on restaurant transactions) and also enjoys French music (e.g., based on purchases of French songs via a music provider). Accordingly, the one or more personal attributes associated with the person may be an affinity for French culture. The frequency and/or extent of travel as determined based on the personal attributes may provide an indication of a person's willingness to travel and/or the distance or other extent to which the person is likely to travel. According to an implementation, a machine learning model may be used to identify the one or more personal attributes based on the transactional data.

One or more future locations for a person may be identified based on the personal attributes. The future locations may correspond to the personal attributes such that the future locations have a connection to or a difference from the personal attributes. According to an implementation, a machine learning model may be used to identify the one or more future locations for the person, based on the personal attributes.

A subset of the reachable locations may be identified based on the future locations and a graphical interface (e.g., a graphical user interface GUI) may be generated to visually display the subset of the reachable locations on a virtual map.

Implementations disclosed herein provide a number of technical benefits including reduction in resources used, reduction in storage requirements, faster processing, or the like. For example, by limiting the number of reachable locations based on either the previous locations or the future locations, as further disclosed herein, fewer system resources are expended in providing a subset of reachable locations via a graphical interface. Additionally, limiting the number of reachable locations also requires use of less memory that stores the subset of reachable locations. Additionally, limiting the number of reachable locations also enables faster loading of interfaces such as maps that show the subset of reachable locations.

FIG. 1 depicts an exemplary computing environment 100 that may be utilized with techniques presented herein. In some embodiments, the computing environment 100 is, includes, and/or forms a portion of a reachable location visualization system. FIG. 1 includes one or more user device(s) 105 associated with one or more persons 103 (also referred to as users), a location module 107, journey hosts 109, distance point module 111, reachable location module 113, and visualization module 115 that are part of the computing environment 100. Some or all of the components shown in computing environment 100 may communicate across an electronic network 125. Each user device 105 may be associated with a respective person 103 or multiple persons may use the same device 105. The location module 107 may track locations signals from one or more user devices 105 and store or provide corresponding locations. Alternatively or additionally, the location module 107 may track location signals and a cloud based component may associate corresponding locations based on the location signals and/or store the corresponding locations via the electronic network 125. The location module 107 may be associated with a given person such that the person's current or previous locations may be correlated with entered credentials and/or spending habits.

The journey hosts 109 may be journey hosts that can provide at least one travel accommodation to a person 103 based on, for example, distance points associated with the person. The journey hosts 109 may facilitate, coordinate, directly provide, indirectly provide, or otherwise manage travel based on one or more mediums such as air travel, land travel, hub connections, train travel, water travel, or the like. The journey hosts 109 may be associated with respective journey possibilities. The journey possibilities may include destinations, routes, connections, or the like that a given journey host 109 can accommodate. Each journey host 109 may accommodate its own set of journey possibilities and those journey possibilities may change at any time. The changes may be based on business needs, available space, market trends, regulations, costs, preferences, contracts, or the like. As an example, a journey host 109 may be an international airline that runs a number of flights on a daily basis. The international airline may have one or more hubs such that most of its flights are routed through the one or more hubs.

The distance point module 111 may store distance point information for one or more persons 103. The distance point module 111 may calculate distance points for a given person 103 based on any one of transaction data, rewards, airline miles traveled, deals, or the like. The distance point module 111 may be configured to update the number of distance points associated with a person 103 based on the person 103 incurring distance points or consuming distance points. The distance point module 111 may also apply one or more rules associated with distance points such as a multiplier rule in incurring or consuming distance points, a step-based increase or decrease in distance points, or the like. The distance point module 111 may also convert the distance points based on an applicable journey host 109. For example, 10,000 distance points may correspond to 10,000 miles for a first journey host 109 and may correspond to 15,000 distance points for a second journey host 109.

The reachable location module 113 may calculate reachable locations based on a number of distance points associated with a person 103 as well as journey possibilities scraped from a plurality of journey hosts 109. The reachable location module 113 may incorporate the one or more rules associated with distance points, as determined by the distance point module 111 disclosed herein.

Visualization module 115 may generate a map (e.g., world map, regional map, interactive map, etc.) that provides a subset of reachable locations to a person based on their distance points, on reachable locations, on previous locations, and/or future locations. The visualization module 115 may also cause the visual display of distance points, information about distance point behavior (e.g., points accumulated per month), target distance points, distance points needed to reach a location, or the like. The visualization module 115 may operate more efficiently based on the application of one or more of the reachable locations, previous locations, and/or future locations when compared to providing all possible locations to a person, as it may expend less resources to provide a subset of reachable locations to the person.

The systems and devices of the computing environment 100 may communicate in any arrangement. As will be discussed herein, systems and/or devices of the computing environment 100 may communicate in order to identify a subset of reachable locations and/or to generate graphical interfaces based on the subset of reachable locations.

The user devices 105 may include a computer system such as, for example, a desktop computer, a mobile device, a tablet, a laptop, a wearable device such as a smart watch, smart glasses, etc. In an exemplary embodiment, a user device 105 is a telephone, e.g., a mobile phone, or the like. In some embodiments, the user device 105 may include one or more electronic application(s) (e.g., a program, plugin, etc.), installed on a memory of the user device 105. The electronic applications may be programs such as a distance point trackers, travel planner, location viewer, or the like. In some embodiments, the electronic application(s) may be associated with one or more of the other components in the computing environment 100. For example, the electronic application(s) may include a portal for accessing and/or interacting with one or more of the other components in the computing environment 100.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, a portion of the location module 107 may be provided to the user device 105 as an electronic portal via an electronic application. At least a portion of the distance module 111, reachable location module 113, and/or visualization module 115 may be part of the same component or may all be implemented within the electronic network 125. Further, it should be understood that data described as stored on a memory of a particular system or device in some embodiments, may be stored in another memory or distributed over a plurality of memories of one or more systems and/or devices in other embodiments. Additionally, or alternatively, some or all of the distance module 111, reachable location module 113, and/or visualization module may be part of the same entity that receives data from one or more components (e.g., user device via electronic network 125) and may transmit data to one or more components. The entity may physically house these components in the same or different locations or may access these components via a cloud based connection (e.g., via electronic network 125).

In the implementations described herein, various acts are described as performed or executed by components from FIG. 1. However, it should be understood that in various implementations, various components of the computing environment 100 discussed above may execute instructions or perform acts including the acts discussed herein. Further, it should be understood that in various implementations, one or more steps may be added, omitted, and/or rearranged in any suitable manner.

FIG. 2A illustrates an exemplary process 200 for identifying a subset of reachable locations and generating a graphical interface, such as in the examples discussed above. The process 200 may be implemented based on a request for reachable locations by a person 103 or may occur periodically (e.g., in the background) such that the results of the process are available to a person 103 at any time. The results obtained through this process may be updated based on a pre-determined time period or may be determined by an entity or user or may be triggered based on changes (e.g., as indicated by one or more journey hosts).

At 202, a number of distance points connected to a person at a point in time may be determined via distance point module 111. The number of distance points may be associated with the person via a user account, may be connected to a transaction account (e.g., a credit card account, rewards account), may be connected to a travel account, or the like.

According to an implementation, the number of distance points may be a current number of distance points or a predicated future number of distance points. The current number of distance points may be the number of distance points accumulated by a person 103 via expenditure, promotions, etc., less any distance points used by the person 103. A predicted future number of distance points may be a number of distance points determined based on historical expenditure by the person 103. Historical expenditure by person 103 may be analyzed to predict the future distance points. For example, for a person 103 that averages spending $1,000 per month, a predicted future number of distance points may be determined to be 6,000 in six months, which may align with the time that the person 103 is looking to book travel. Predicting a future number of distance points may be conducted via a machine learning model trained using a plurality of sample transaction data in combination with corresponding future point accumulations. Generating, training, and using a machine learning model is further disclosed herein. The input to the machine learning model may be the person 103's past expenditure and the model may output the predicated future number of distance points based on the past expenditure. The predicted future number of distance points may also be based on time of year, recent changes in expenditure, predicted changes in expenditure, or the like.

Distance points may accumulate based on a time-based accumulation, expenditure-based accumulation, rule-based accumulation, a target-based accumulation, or a combination thereof.

The time-based accumulation may result in a person 103 accumulating distance points over a period of time. The person 103 may receive a number of distance points after an expiration of the period of time. A person 103's action may be tied to the accumulation of distance points based on a time-based accumulation such as a minimum expenditure or an association with an entity or account. Expenditure-based accumulation may result from the person 103 spending money generally and may be rule-based such that spending money at a given time, location, on a category, or the like may result in different amounts of distance points. Rule-based accumulation may be based on any applicable rules (e.g., expenditure category) such that one or more person actions (e.g., travel, expenditure, succession of travel or expenditure, etc.) may result in corresponding rule based distance points. Target-based accumulation may enable a person 103 to accumulate distance points based on achieving one or more target thresholds. The target thresholds may be expenditure-based thresholds, user-based thresholds, travel-based thresholds, or the like. For example, a target-based threshold may be using a given card for four or more categories of purchases in a given month, such that achieving the threshold results in a bonus number of distance points.

The number of distance points connected to a person may be stored in a cloud account, server, database, or the like and may be associated with the person based on a user account, transaction account, or other account connected to the person. The number of distance points may change based on any number of factors and may change periodically at pre-determined intervals or based on actions (e.g., upon payment of a bill), or in real time or near real time (e.g., upon completion of a transaction).

The number of distance points may be determined based on accessing an account backend or application programming interface (API) associated with a person's account. Alternatively, a system that provides reachable locations to a person may receive the number of distance points associated by the person as a data point.

At 204 of FIG. 2A, a plurality of indexes corresponding to a respective plurality of journey hosts 109 may be scraped to identify zero, one, or a plurality of journey possibilities for each journey host. Scraping the plurality of indexes corresponding to the respective plurality of journey hosts 109 may include extracting information from a server, a memory, a cloud database, a local database, or a look-up table. A scraping module, bot, algorithm, or other component may be used to scrape the plurality of indexes. The plurality of journey hosts may grant access to a scraping module, bot, algorithm, or other component to enable scraping of a corresponding index. The journey possibilities for each journey host 109 may change from time to time. The journey possibilities may be a subset of all available journeys via a given journey host 109, previous journeys by a given journey host 109, or the like.

The available possibilities may be filtered based on one or more filter criteria such as, but not limited to, passenger number, class designation, journey time, journey duration, number of stops, or the like. The filter criteria may be provided by a person 103 via a user device 105 (e.g., using a filter list option), may be automatically generated (e.g., based on a person's preferences, history, attributes, etc.), or may be retrieved from a given person's account. Alternatively, or in addition, the available possibilities may be filtered based on limitations, rules, or other restraints that may be in place between a journey host 109 and person 103 (e.g., person's account, person's transaction account, person's transaction card, etc.). For example, a given journey host 109 may offer one hundred different available journeys on a given day. The different available journeys may be reduced to seventy journey possibilities based on limitations (e.g., contractual relationship-based limitations) imposed between the given journey host and a person's corresponding user account. The reduction may be imposed based on an agreement between the person's user account merchant and the journey host. The different journey possibilities may further be reduced based on one or more filter criteria, as disclosed herein.

Figures 3A, 3B:
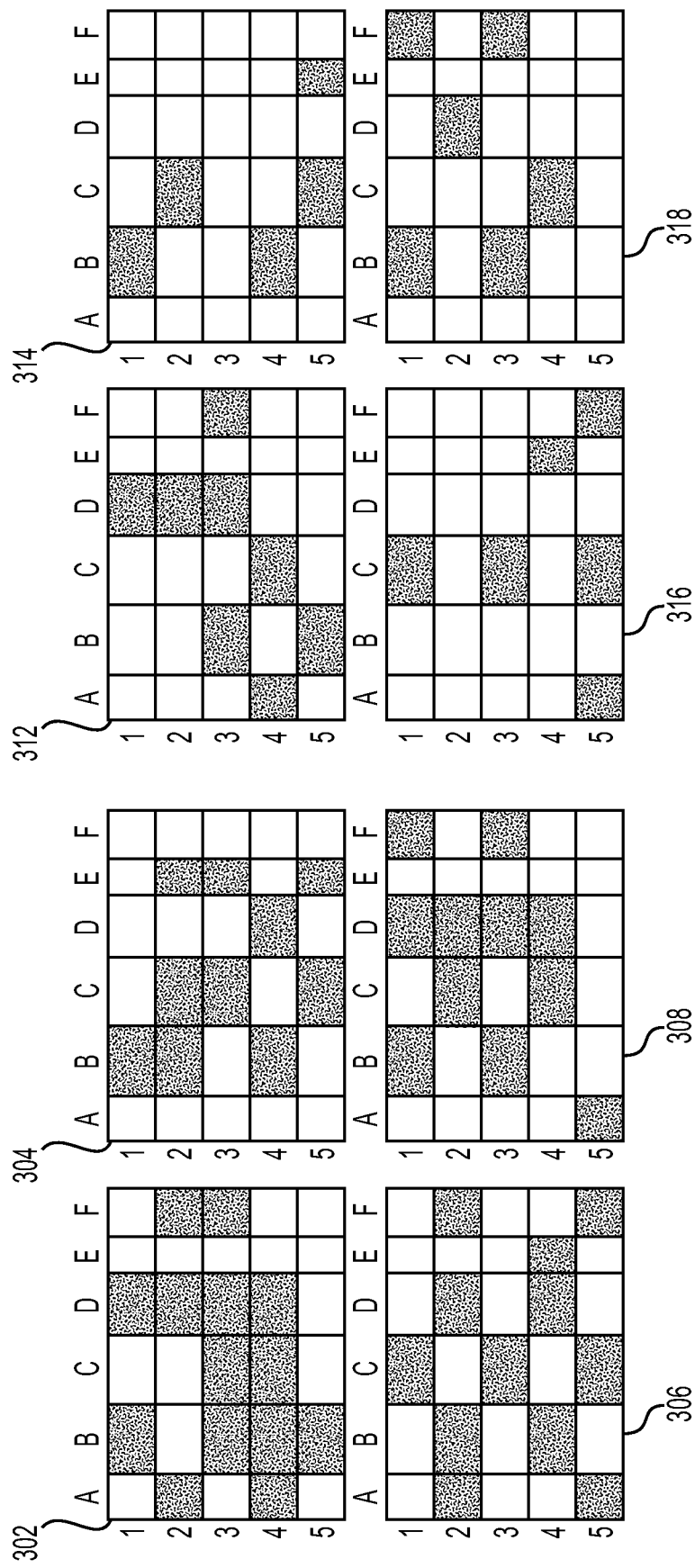
FIG. 3A depicts an exemplary location matrix, according to one or more embodiments.
FIG. 3B depicts another exemplary location matrix, according to one or more embodiments.

FIG. 3A shows example matrixes of journey possibilities scrapped from corresponding indexes 302, 304, 306, and 308. As shown in FIG. 3A, each index 302, 304, 306, and 308 may have a number of available journeys associated with the corresponding journey host 109, as represented by each box (i.e., shaded and unshaded boxes A1 through F5) for each of the indexes 302, 304, 306, and 308. Based on the scraping at 204 of FIG. 2A, a plurality of journey possibilities for each journey host 109 may be identified from the set of available journeys. As disclosed herein, at 204, the journey possibilities may be filtered based on filter criteria and/or a relationship between a journey host 109 and a person 103 (e.g., person's account, person's transaction account, person's transaction card, etc.). In FIG. 3A, the shaded boxes (e.g., index 302's box B1, D1, A2, D2, F2, etc.) represent journey possibilities identified at 204 of FIG. 2A and the non-shaded boxes (e.g., index 302's box A1, C1, E1, F1, B2, C2, etc.) represent available journeys that did not meet one or more filters (e.g., relationship between journey host 109 and person, filter criteria, etc.). As another example, index 306 of a journey host 109 includes a number of shaded boxes (e.g., index 306's box C1, A2, B2, D2, etc.) that represent journey possibilities for a given person 103 associated with the scrapping to determine the journey possibilities represented by the shaded boxes via a journey host corresponding to index 306. The non-shaded boxes (e.g., index 306's box A1, B1, D1, E1, F1, C2, etc.) may be available journeys that the corresponding journey host 109 can host, but are filtered due to a relationship, criteria, or the like.

Accordingly, as shown, each of the indexes 302, 304, 306, and 308 include boxes that represent available journeys (e.g., all journeys available via a respective journey host) and the shaded boxes represent journey possibilities, from each respective index, that are available to a person 103 based on one or more criteria and/or any applicable relationship between the person 103 and the respective journey host 109.

Returning to FIG. 2A, at 206, a plurality of reachable locations are generated based on the number of distance points from 202 and the journey possibilities from 204, via reachable location module 113. The plurality of reachable locations correspond to locations in the world, a region, a country, etc., that can be traveled to by a given person 103 based both on the number of distance points associated with a person 103 and the journey possibilities associated with the user/user's criteria as provided by one or more journey hosts 109. For example, a person 103 may have 10,000 distance points associated with their distance-based account. At 202, an indication of the 10,000 distance points may be received. At 204, indexes corresponding to a plurality of journey hosts 109 may be scraped to identify a plurality of journey possibilities. At 206, the number of distance points required for each of the journey possibilities identified at 204 may be analyzed and one or more reachable locations that correspond to journey possibilities that require less than or equal to the available distance points may be generated.

FIG. 3B shows example matrixes 312, 314, 316, and 318 of reachable locations from corresponding indexes 302, 304, 306, and 308. The example matrixes 312, 314, 316, and 318 are based on the corresponding indexes 302, 304, 306, and 308 respectively. Each index 302, 304, 306, and 308 of FIG. 3A provides a number of journey possibilities via the shaded boxes. For example, index 302 provides a number of journey possibilities via shaded boxes B1, D1, A2, D2, F2, etc. FIG. 3B shows a corresponding matrix 312 that shows a reachable locations from the journey possibilities of index 302. The reachable locations of matrix 312 is a subset of the journey possibilities of corresponding index 302. Similarly, matrix 314 corresponds to index 304, matrix 316 to index 306, and matrix 318 to index 308. The shaded boxes of matrixes 312, 314, 316, and 318 correspond to reachable locations based on the journey possibilities of corresponding indexes 302, 304, 306, and 308, and further based on the number of distance points required to reach each of said journey possibilities, and further based on the number of distance points available to a given person 103. Accordingly, as a specific example, shaded box D1 in index 302 corresponds to a journey possibility. The corresponding shaded box D1 in matrix 312 corresponds to a reachable location such that the number of distance points associated with a given person 103 is greater than or equal to the number of distance points needed for the person 103 to travel to the journey possibility D1 of index 302. Continuing the example, the shaded box B1 of index 302 corresponds to a journey possibility. The corresponding un-shaded box B1 in matrix 312 corresponds to a journey that is not reachable such that the number of distance points associated with a given person 103 is less than the number of distance points needed for the person 103 to travel to the journey possibility B1 of index 302.

Returning again to FIG. 2A, at 208, location signals generated via a location sensor of a user device 105 associated with a person 103 may be received and one or more previous locations may be identified based on the location signals at 210. The location signals may be generated constantly, periodically, or based on specific actions. The location signals may be generated by a location module 107 that may be part of the user device 105. The location module 107 may be part of the user device 105's hardware and the location signals generated via the location module 107 may be used by one or more applications associated with the user device 105. The location module 107 may generate the location signal via any applicable format such as, but not limited to, GPS, Bluetooth, Wi-Fi, triangulation (e.g., cellular triangulation), tag sensing, or the like. The location signal may be converted to a location (e.g., coordinates, country, city, area, region, etc.) either at the location model 107, user device 105, or a cloud component via electronic network 125.

According to an implementation, the location module 107 may store or may facilitate the storage of a plurality of previous locations associated with a person 103. The plurality of previous locations associated with the person 103 may be stored at the user device 105, a cloud component, or one or more remote components. The plurality of previous locations may be determined and/or stored based on a predetermined time period (e.g., every day, every hour, every week, etc.), based on a change in location, or based on an action (e.g., a person 103's use of a user device 105, an image taken using a user device 105, etc.). As disclosed herein, a person 103's location-based information (e.g., previous locations) may be received from multiple user devices 105 associated with the same person 103 and may be received from replaced or upgraded devices over time. For example, a person 103's mobile phone and wearable watch may both provide location signals and the location signals or locations associated with the location signals may be stored. If the person 103 upgrades her mobile phone and associates the upgraded phone with a corresponding user account, then location signals from the upgraded phone may be used to identify the person 103's location.

FIG. 4 shows an example world map 400 that includes a plurality of previous locations 402 associated with a user. The previous locations 402 may be all or a subset of previous locations visited by the person 103. The previous locations 402 may be collected over a period of time that may as long as the person 103's user device 105 was used to generate location signals, or a pre-determined period of time (e.g., 1 year, 5 years, 10 years, etc.). The locations shown on the world map 400 may be saved as coordinates, as countries within which the corresponding coordinates are contained, and/or as regions. According to an implementation, a calculation may be made based on the amount of time spent in a given location such that only a location where a minimum amount of time was spent is designated a previous location. For example, location signals indicating that a user device 105 is in a given location for at least one day may be required for that given location to be designated a previous location. According to this implementation, the plurality of previous locations 402 may correspond to locations where the location signals form a person 103's user device 105 indicate that the user device 105 was in the corresponding locations for at least one day.

As noted above, at 212, a subset of the reachable locations generated at 206 may be identified based on the previous locations identified at 210. The subset of reachable locations identified at 212 may be selected from reachable locations as shown in, for example, the matrixes 312, 314, 316, and 318 of FIG. 3B. Accordingly, the subset of reachable locations may be some or all of the reachable locations that are a subset of the journey possibilities of 204 such that they meet one or more filter criteria and/or relationship based rules and also locations that are reachable based on the number of distance points associated with a person 103.

According to an implementation, the subset of reachable locations identified at 212, based on the previous locations identified at 210, may be locations that do not overlap with the previous locations. Accordingly, if the reachable locations generated at 206 include one or more previous locations associated with a person, those one or more previous locations may be excluded from the reachable locations to identify the subset of the reachable locations at 212. FIG. 5A shows an example of a subset of reachable locations identified at 212 such that the reachable locations do not overlap with previous locations. The matrixes 502, 504, 506, and 508 of FIG. 5A correspond to the matrixes 312, 314, 316, and 318 of FIG. 3B, respectively, such that the shaded boxes of matrixes 502, 504, 506, and 508 (i.e., subset of reachable locations) are a subset of the shaded boxes of matrixes 312, 314, 316, and 318 (i.e., reachable locations). For example, the location represented by matrix 312's D1 may be a location that the person 103 associated with the reachable location D1 has not previously traveled to. Accordingly, the same location represented by matrix 502's D1 is shaded to indicate that matrix 502's D1 is included in a subset of reachable locations based on the subset including locations not previously visited by the person 103.

Locations not previously visited by a person 103 may be determined based on a location designator. The location designator may be a country, region, area, or the like such that a given location designator is considered visited if the previous location falls within that location designator. For example, if the location designator is a country, then a visit to any state in the United States designates the entire United States as a previously location. Similarly, the location designator may be a pre-determined or dynamically determined distance (e.g., a radius) such that locations that fall within the pre-determined or dynamically determined distance from a visited location are designated previously visited. According to this implementation, if the distance is 1000 miles, Los Angeles, Calif. would not be considered previous location based on a person 103 visiting New York City, N.Y., which is over 1000 miles apart from Los Angeles, Calif. A dynamically determined distance may be a distance that changes based on a person 103's home location, previous locations, user selections, or the like. For example, the dynamically determined location may expand the closer a reachable location is to the person 103's home and may shorten the further away a reachable location is to the person 103's home, or vice versa.

According to an implementation, the subset of reachable locations identified at 212, based on the previous locations identified at 210, may be locations that overlap or tangentially overlap with the previous locations. A tangential overlapping location may be a location proximate to, though not the same as, a previous location. Accordingly, if the reachable locations generated at 206 include one or more previous locations associated with a person, those one or more previous locations may be included in the reachable locations to identify the subset of the reachable locations at 212. FIG. 5B shows an example, of a subset of reachable locations identified at 212 such that the reachable locations overlap or tangentially overlap with previous locations. The matrixes 512, 514, 516, and 518 of FIG. 5B correspond to the matrixes 312, 314, 316, and 318 of FIG. 3B, respectively, such that the shaded boxes of matrixes 512, 514, 516, and 518 (i.e., subset of reachable locations) are a subset of the shaded boxes of matrixes 312, 314, 316, and 318 (i.e., reachable locations). For example, the location represented by matrix 312's D2 may be a location that the person 103 associated with the reachable location D1 has previously traveled to. Accordingly, the same location represented by matrix 512's D2 is shaded to indicate that matrix 512's D2 is included in a subset of reachable locations based on the subset including locations previously visited by the person 103. The subset of reachable locations based on previously visited locations shown in FIG. 5A do not overlap with the subset of reachable locations based on previously not visited locations shown in FIG. 5B.

Locations previously not visited by a person 103 may be determined based on a location designator. The location designator may be a country, region, area, or the like such that a given location designator is considered not visited if a previous location falls outside that location designator, in a manner similar to that described herein for previously visited locations. It will be understood although the subset of reachable locations identified at 212 may be featured for a given person 103, the person 103 may be able to access all of the reachable locations, including those that are not featured based on the person 103's one or more previous locations identified at 210.

Indexes 302, 304, 306, 308 and matrixes 312, 314, 316, 318, 502, 504, 506, 508, 512, 514, 516, and 518 are generally described herein as locations. However, it will be under stood that any of the boxes in the indexes and/or the matrixes may correspond to routes instead of specific locations or destinations. For example, a box D1 in index 302 may correspond to a specific route from Dulles Airport, Virginia, United States to Lisbon Portela Airport, Lisboa, Portugal. The specific route may also be unique based on one or more other criteria including the specific transport (e.g., via flight number, time of departure or landing, etc.).

Figure 6A:
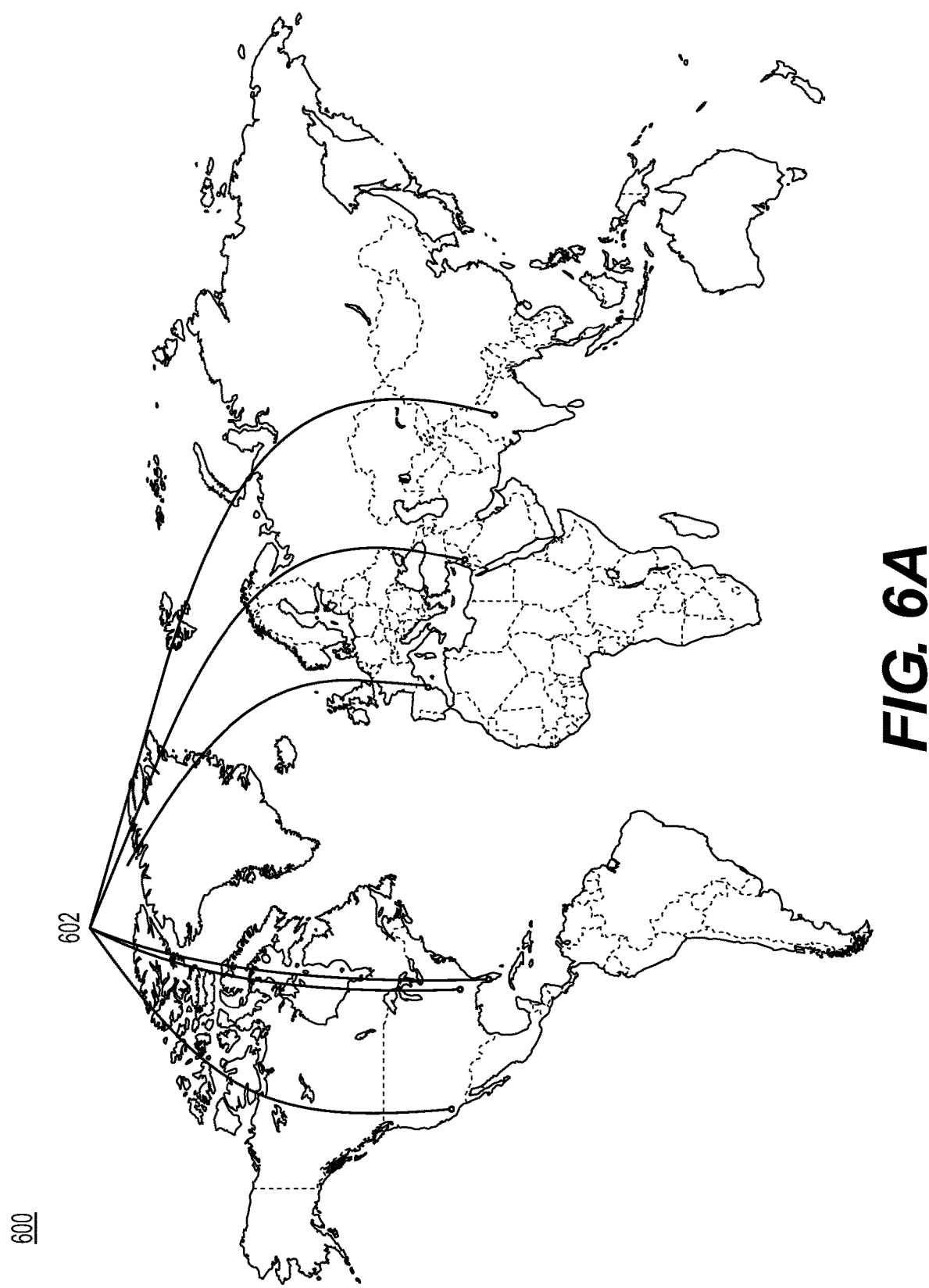
FIG. 6A depicts an example recommendation world map based on visited locations, according to one or more embodiments.
Figure 6B:
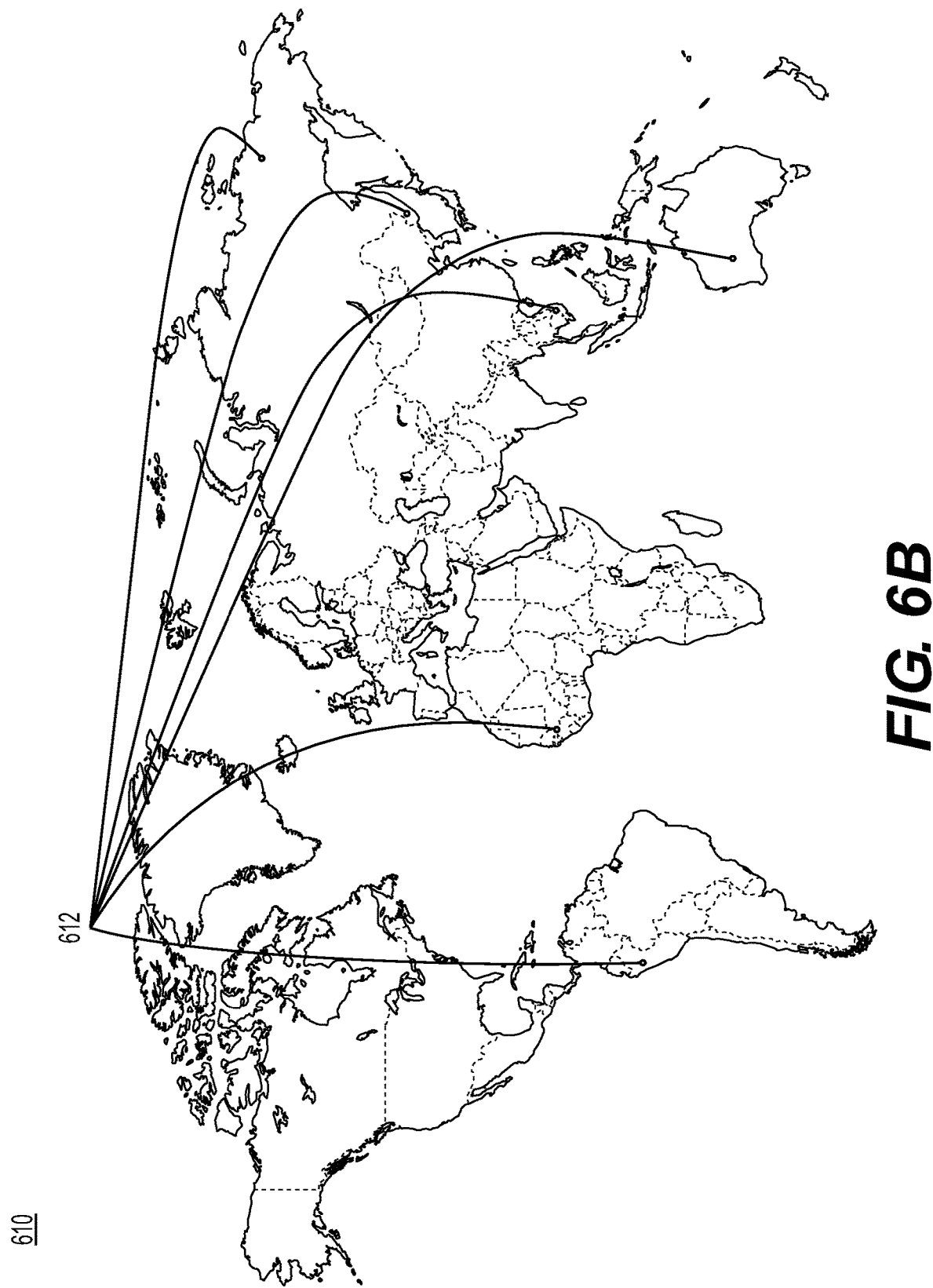
FIG. 6B depicts an example recommendation world map based on excluding visited locations, according to one or more embodiments.

At 214, a graphical interface to visually display the subset of the reachable locations on a map may be provided via visualization module 115. FIGS. 6A and 6B show two example graphical interfaces to visually display a subset of reachable locations on a map. FIG. 6A shows map 600 with visual indications for a subset of reachable locations 602 that overlap previously visited locations, as shown in FIG. 4. FIG. 6B shows map 610 with visual indications for a subset of reachable locations 612 that excludes previously visited locations. The graphical interface may allow a user to select one or more of the provided subset of reachable locations, zoom in or out, may change colors based on mouse-over or hovers, or the like. According to an implementation, a list (not shown) corresponding to the locations shown in the map may be provided in addition to the map.

The graphical interface may also update based on one or more inputs such as one or more criteria, one or more filters, one or more estimated distance points, or the like. For example, a user may be able to provide the distance points determined at 202 of FIG. 2A. Accordingly, the process 200 of FIG. 2A may be implemented based on distance points provided by the user such that the graphical interface provides a subset of reachable locations based on the user provided distance points. The user may be able to enter the distance points, adjust an interface item (e.g., a sliding bar, a button, a dial, etc.) to provide the distance points, or the like.

According to an implementation, in addition to the providing the subset of the reachable locations based on the graphical interface, one or more location attributes about one or more of the subset of reachable locations may be provided. The one or more location attributes may include, but are not limited to, food based attributes, shopping based attributes, services, attractions, events, landscapes, etc. The one or more location attributes may be pre-determined for the one or more given locations or may be dynamically determined based on a person 103's preferences and/or attributes. For example, a person 103's transaction data may show that the person 103 tends to explore multiple restaurants each day that she travels. Accordingly, the graphical interface may provide top restaurants and/or restaurant deals proximate to each of the subset of reachable locations.

Figure 2B:
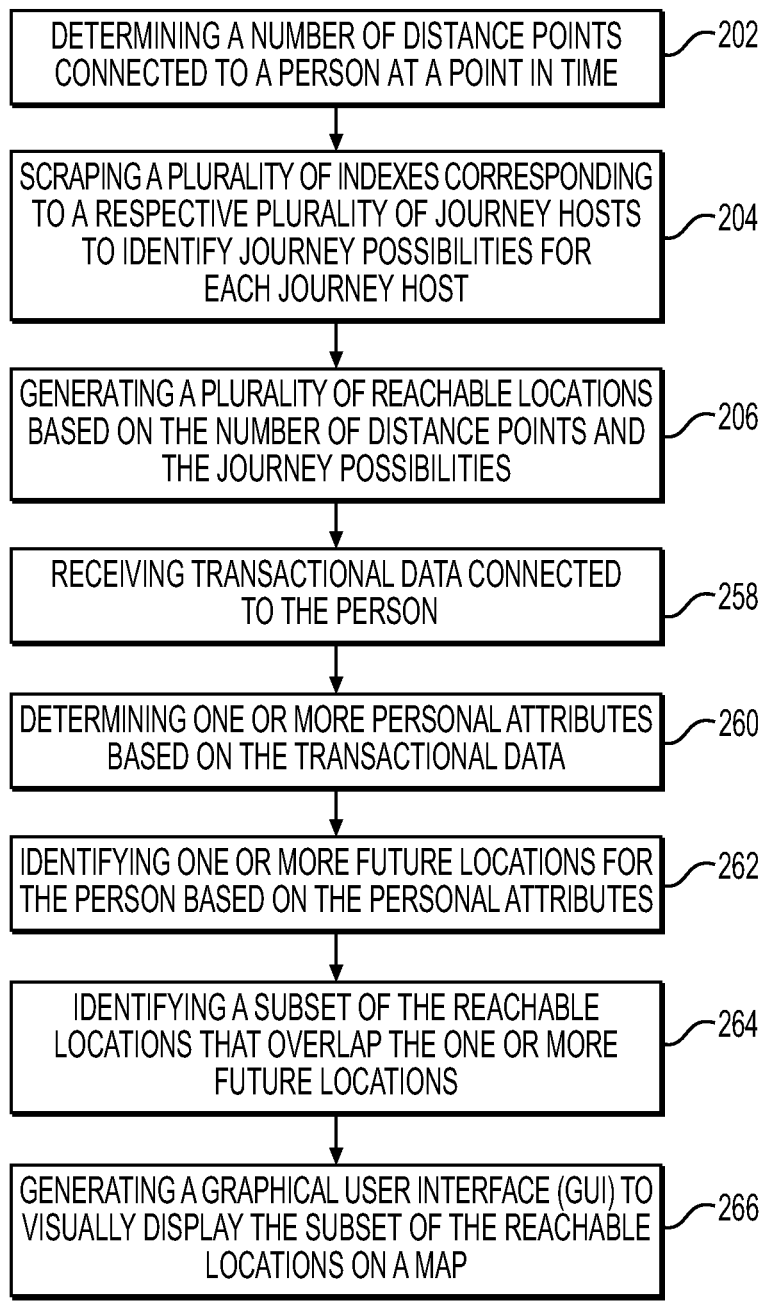
FIG. 2B depicts a flowchart of another exemplary method for generating a graphical interface to display a subset of reachable locations, according to one or more embodiments.

FIG. 2B illustrates another exemplary process 250 for identifying a subset of reachable locations and generating a graphical interface, such as in the examples discussed above. The process 250 may be implemented based on a request for reachable locations by a person or may occur periodically (e.g., in the background) such that the results of the process are available to a person at any time. The results obtained through this process may be updated based on a pre-determined time period or may be determined by an entity or user or may be triggered based on changes (e.g., as indicated by one or more journey hosts). Where, in process 200 of FIG. 2A, the subset of reachable locations was determined based on location signals, in the process 250 of FIG. 2B, the subset of reachable locations is determined based on future locations, as further disclosed herein.

Steps 202, 204, and 206 of FIG. 2B correspond to the same steps as described in FIG. 2A. Accordingly, for brevity, description regarding these steps and associated FIGS. 3A and 3B is not repeated herein. To summarize, a number of distance points connected to a person 103 are determined at 202, a plurality of indexes corresponding to a respective plurality of journey hosts are scraped to identify a plurality of journey possibilities for each journey host, at 204, and a plurality of reachable locations is generated based on the number of distance points and the journey possibilities, at 206.

At 258, transactional data connected to the person 103 may be received. The transactional data may be associated with the same system that manages the distance points (e.g., the distance point module 111). For example, the distance points may be associated with a credit card such that expenditure using the credit card corresponds to obtaining corresponding distance points. Accordingly, the transactional data may be associated with the same credit card such that the transactional data may include the transactions that some or all of the distance points are associated with. Alternatively, or additionally, the transactional data may be received from one or more third parties. The person 103 may authorize the one or more third parties to provide the transactional data.

The transactional data may include, but is not limited to, amount spent, good or service, time, date, location, category associated with good or service, local associated with good or service, or the like or a combination thereof. As an example, a person 103 may purchase a golf club and the transactional data associated with the purchase may include the cost of the club, an indication that the purchase was for a golf club, the time, date, and location of purchase, categories "golf", "outdoor", and "sport", or the like.

At 260, one or more personal attributes may be determined based on the transactional data received at 258. The one or more personal attributes may include, but are not limited to, hobbies, likes, dislikes, preferences, expenditure attractors, expenditure detractors, habits, cyclical habits, travel attributes, location preferences, travel preferences, destination preferences, or the like or a combination thereof. The one or more personal attributes may be determined based on the transactional data based on associating weights to personal attributes based on the transactional data.

According to an implementation, a machine learning model may be used to output personal attributes based on transactional data. The machine learning model may be trained using a dataset including supervised, partially supervised, or unsupervised sample transactional data and associated personal attributes. For example, a learning algorithm (e.g., clustering algorithm, a neural network, a deep learning network, a genetic learning algorithm, or algorithms based on Convolutional Neural Networks (CNN), CNN with multiple-instance learning or multi-label multiple instance learning, Recurrent Neural Networks (RNN), Long-short term memory RNN (LSTM), Gated Recurrent Unit RNN (GRU), graph convolution networks, etc.) may be provided transaction data and tagged user attributes for users associated with corresponding transactional data. By applying a large plurality of such transactional data and associated user attributes, the machine learning algorithm may be trained to identify personal attributes based on the transactional data. The machine learning algorithm may be used to generate the machine learning model that outputs personal attributes based on transactional data received as input to the machine learning model.

At 262, one or more future locations may be identified based on the personal attributes. The future locations may be selected based on attributes of the future locations matching with the personal attributes of a person 103. Continuing the previous example, a person 103 that purchases a golf club may prefer to travel to a destination that offers a golf course. Accordingly, a future location for that person 103 may be determined in part based on available golf courses. For example, Orlando, Fla., United States, a location known for having a plethora of golf courses may be selected as a future location whereas Israel, a country with only one golf course, may not be a future location. As another example, a person 103 may purchase a copy of "The Sun also Rises" by Ernest Hemingway, as provided via the transactional data received at 258. At 260, a personal attribute associated with the person 103 may be a current affinity for France and Spain based on the book being based in those two locations. Accordingly, at 262, two future locations associated with the person 103 may be identified as France and Spain.

According to an implementation, access to a personal account associated with the person 103 may be received. The personal account may be, for example, a social account, a social media account, a collaboration account, a media account, a file storage account, or the like. One or more personal preferences may be identified based on access to the personal account. The one or more personal preferences may be identified using a machine learning model that receives, as input, aspects of the personal account and provides, as output, the one or more personal preference. For example, access to a social media account may be received. The social media account may include one or more pictures posted by the person 103. Based on an analysis of the pictures or metadata associated with the pictures, one or more personal preferences (e.g., hiking, music, beaches, etc.) may be identified.

The personal attributes identified at 260 maybe augmented based on the one or more personal preference. An identified personal attribute may be confirmed, invalidated, or modified based on the one or more personal preferences. For example, a personal attribute that a person 103 enjoys hiking may be identified based on the person 103's transactional data indicating the purchase of hiking shoes. Additionally, the person 103's social media account may include pictures of hiking next to water bodies. Accordingly, the personal attribute indicating that the person 103 enjoys hiking may be augmented by the personal reference that the person 103 enjoys hiking next to bodies of water.

At 264, a subset of the reachable locations generated at 206 may be identified based on the future locations identified at 264. The subset of reachable locations identified at 264 may be selected form reachable locations as shown in, for example, the matrixes 312, 314, 316, and 318 of FIG. 3B. Accordingly, the subset of reachable locations may be some, most, or all of the reachable locations that are a subset of the journey possibilities of 204 such that they meet one or more criteria and relationship based rules and also may be locations that are reachable based on the number of distance points associated with a person 103.

The subset of reachable locations identified at 264 may be reachable locations generated at 206 that overlap with the future locations of 262. Accordingly, the subset of reachable locations identified at 264 may be locations that a person 103 can travel to using the distance points determined at 202 and that are recommended based on the person 103's personal attributes. The subset of reachable locations identified at 264 may be locations that person 103 is more likely to travel to than other locations, such as those from the reachable locations that did not overlap with the future locations, based on the person 103's interests.

The subset of reachable locations identified at 264 may be provided by generating via a graphical interface (e.g., a GUI) to visually display them on a map, at 266. The visualization module 115 may be used to generate the graphical interface. The subset of reachable locations identified at 264 may be provided via a map in a manner similar to FIGS. 6A and 6B, as disclosed herein. For brevity, the disclosure related to FIGS. 6A and 6B is not repeated. The graphical interface may also update based on one or more inputs such as one or more criteria, one or more filters, one or more estimated distance points, or the like. For example, a user may be able to provide the distance points determined at 202 of FIG. 2A. Accordingly, the process 200 of FIG. 2A may be implemented based on distance points provided by the user such that the graphical interface provides a subset of reachable locations based on the user provided distance points. The user may be able to enter the distance points, adjust an interface item (e.g., a sliding bar, a button, a dial, etc.) to provide the distance points, or the like.

According to an implementation, a unique personal profile may be generated for each person 103. The personal profile may be associated with a storage or memory and that stores the person 103's past locations, personal attributes, future locations (e.g., based on personal attributes, as disclosed herein), The unique personal profile may be updated based on transactions made by the person 103, additional locations logged by a corresponding user device 105, or the like. Accordingly, the subset of reachable locations at 212 of FIG. 2A and/or subset of reachable locations at 264 of FIG. 2B may be determined by using a person 103's unique personal profile as an input to a machine learning model that outputs the corresponding subset of reachable locations. The machine learning model may be applied iteratively such that as a person 103's unique personal profile changes, the output of the machine learning model (i.e., a subset of reachable locations) may also change. A unique personal profile may be generated based on information received form a user device 105, personal accounts, public accounts, social media accounts, or the like.

FIG. 7A shows an example graphical interface with panel 702 that may be provided along with a map or independent from a map. An indicator 704 may be provided to indicate the number of distance points a person 103 currently has allocated to an account associated with the person 103. The indication may be a bar, as shown in FIG. 7A that may also indicate a number of distance points needed to reach a next tier (e.g., as shown via text 706) or may be configured to indicate a number of distance points need to reach a desired destination.

A panel 708 may provide a list 710 of currently reachable locations, and may correspond to the maps disclosed herein, such as map 600 of FIG. 6A or map 610 of FIG. 6B. The list 710 of currently reachable locations may be ordered based on one or more criteria such as most recently visited, highest match with personal attributes, or the like. For example, a list ordered based on personal attributes may enable a person 103 to quickly select a destination or route that the person is more likely to select, based on her interests. Such an ordering may save the person 103 time and effort. According to an implementation, such a ordering may also be provided via a map where one or more destinations may be highlighted based on a similar ordering.

According to an implementation, it may be determined that a given number of distance points are required for a user to travel to a specific location. The user may be provided guidance or incentives to obtain the given number of distance points. For example, the given number of points may correspond to the points to reach a next tier as indicated in FIG. 7A via indicator 704 and/or text 706.

FIG. 7B shows a panel 712 that may be provided along with a map or independent from a map. Panel 712 may be provided along with panel 702 or independent from panel 702. As shown in FIG. 7B, spend goals per location may be provided. The spend goals may be formatted based on a preferred expenditure format determined based on the user's transaction data. For example, if based on a user's transaction data, it is determined that the desired number of distance points will likely be achieved in less than a threshold amount of time (e.g., 1 year), then the format may be expenditure per month, as shown via recommendation 714A and 714B of FIG. 7B. If, based on a user's transaction data, it is determined that the desired number of distance points will likely be achieved in less than a different threshold amount of time (e.g., 1 month or 10 years), then the format may be, for example, expenditure per week or expenditure per year.

FIG. 7B also shows panel 716 which may provide recommendations for goods or services that a person 103 may purchase in order to reach a goal destination such as France, as exemplified in panel 716. The goal destination may be received via user input, may be based on one or more past locations, or may be a recommendation made for a person based on personal attributes. Panel 716 may be provided along with a map, panel 702, and/or panel 712. As shown, multiple expenditure recommendations 716A, 716B, 716C, and 716D to obtain enough destination points to reach a goal destination (e.g., France) may be provided. The expenditure recommendations may correspond to goods or services that, when purchased, enable the person 103 to obtain enough distance points, in addition to the person 103's existing distance points, to reach the goal destination. The expenditure recommendations 716A, 716B, 716C, and 716D may correlate to an expenditure amount to obtain enough updated distance points such that the required number of distance points required to reach a goal destination (e.g., a desired location) is lower than or equal to the updated distance points after completing an expenditure recommendation. According to an implementation, the specific options (e.g., expenditure recommendations 716A, 716B, 716C, and 716D) may apply one or more multipliers based on a relationship with a good or service provider and the distance point allocation system. The expenditure recommendations may be based on past purchases (e.g., based on a transaction history), based on personal attributes, based on a curated wish list, based on card issuer partners, or the like.

According to an implementation, one or more of the expenditure recommendations may be for a subscription-based service such that a corresponding subscription may result in a recurring points on a chronic basis. One or more of the expenditure recommendations may be for goods or services in categories that a given person 103's account already has promotions in. Such an expenditure recommendation may enable the person 103 to accumulate needed points faster, based on the promotion. In some embodiments, the techniques provided herein, and/or portions thereof may be performed periodically, iteratively, or the like. For example, in some embodiments, the computing environment 100 may be configured and further configured, from time to time, as the distance points associated with a person 103 are accumulated, used, or otherwise updated. In some embodiments, such iterative operation may enable the computing environment 100 to dynamically adapt to changes in distance points, journey possibilities, reachable locations, personal attributes, or the like.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the process illustrated in FIGS. 2A and 2B, may be performed by one or more processors of a computer system, such any of the systems or devices in the computing environments of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 8:
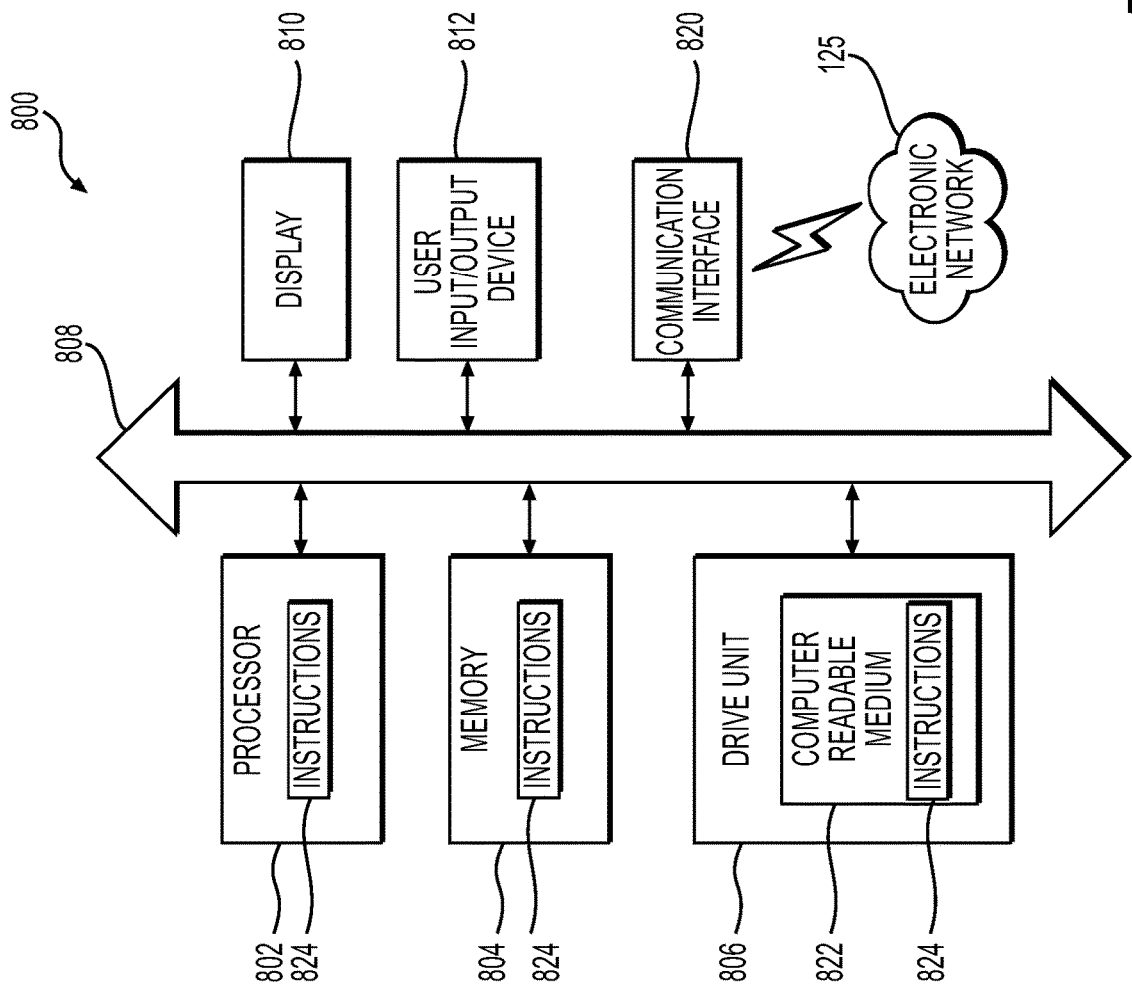
FIG. 8 depicts an example of a computing device, according to one or more embodiments.

FIG. 8 is a simplified functional block diagram of a computer system 800 that may be configured as a device for executing the methods of FIGS. 2A and 2B, according to exemplary embodiments of the present disclosure. FIG. 8 is a simplified functional block diagram of a computer system that may generate interfaces and/or another system according to exemplary embodiments of the present disclosure. In various embodiments, any of the systems (e.g., computer system 800) herein may be an assembly of hardware including, for example, a data communication interface 820 for packet data communication. The computer system 800 also may include a central processing unit ("CPU") 802, in the form of one or more processors, for executing program instructions. The computer system 800 may include an internal communication bus 808, and a storage unit 806 (such as ROM, HDD, SDD, etc.) that may store data on a computer readable medium 822, although the computer system 800 may receive programming and data via network communications. The computer system 800 may also have a memory 804 (such as RAM) storing instructions 824 for executing techniques presented herein, although the instructions 824 may be stored temporarily or permanently within other modules of computer system 800 (e.g., processor 802 and/or computer readable medium 822). The computer system 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for predicting a plurality of future reachable locations, the method comprising:
determining a number of distance points connected to a person at a point in time;
scraping a plurality of indexes corresponding to a respective plurality of journey hosts to identify a plurality of journey possibilities for each journey host of the plurality of journey hosts;
accessing a first machine learning model trained to output predicted future distance points of the person based on past expenditure data of the person and the number of distance points, wherein the first machine learning model is a supervised learning model trained using sample transaction data and corresponding sample future distance points;
providing the past expenditure data of the person and the number of distance points as inputs to the first machine learning model;
receiving a first machine learning output comprising the predicted future distance points from the first machine learning model;
determining a plurality of predicted reachable locations based on the predicted future distance points, the plurality of predicted reachable locations comprising at least a subset of the plurality of journey possibilities correlated to the predicted future distance points;
storing the plurality of predicted reachable locations in a memory;
receiving location signals generated via a location sensor of a device associated with the person;
identifying one or more previous locations of the device based on the location signals;
accessing a second machine learning model trained to output personal attributes of the person based on the past expenditure data of the person, wherein the second machine learning model is trained using one of a supervised or partially supervised sample expenditure data and associated sample personal attributes;
providing the past expenditure data of the person as an input to the second machine learning model;
receiving a second machine learning output comprising the personal attributes of the person;
identifying a subset of the predicted reachable locations based on the previous locations of the device and attributes of the predicted reachable locations matching with the personal attributes;
transmitting the subset of the predicted reachable locations to a user device over a network; and
causing display of a graphical interface comprising the subset of the predicted reachable locations on a map.

2. The computer-implemented method of claim 1, wherein scrapping a plurality of indexes comprises extracting information from a server, a memory, a cloud database, a local database, or a look-up table.

3. The computer-implemented method of claim 1, wherein the plurality of journey hosts grant access to their respective plurality of indexes.

4. The computer-implemented method of claim 1, wherein the plurality of indexes are publically available indexes.

5. The computer-implemented method of claim 1, further comprising:
receiving a desired location;
determining that the desired location does not correlate to the number of distance points; and
providing an expenditure recommendation comprising a required expenditure amount to obtain enough distance points such that the desired location correlates to an updated number of distance points.

6. The computer-implemented method of claim 5, wherein the desired location is based on the one or more previous locations or based on input by the person.

7. The computer-implemented method of claim 1, wherein generating the plurality of predicted reachable locations further comprises:
receiving at least one filter criteria; and
identifying the subset of the predicted reachable locations based also on the at least one filter criteria.

8. The computer-implemented method of claim 7, wherein the at least one filter criteria comprises one or more of passenger number, class designation, journey time, journey duration, or number of stops.

9. The computer-implemented method of claim 7, wherein the subset of the predicted reachable locations is further based on at least one of excluding the previous locations, overlapping with the previous locations, or locations similar to the previous locations.

10. The computer-implemented method of claim 1, further comprising:
providing a person with an adjustable component via the graphical interface;
receiving an input to the adjustable component; and
determining the number of distance points based on the received input.

11. A system comprising:
a data storage device storing processor-readable instructions; and
a processor operatively connected to the data storage device and configured to execute the instructions to perform operations that include:
determining a number of distance points connected to a person at a point in time;
scraping a plurality of indexes corresponding to a respective plurality of journey hosts to identify a plurality of journey possibilities for each journey host of the plurality of journey hosts;
accessing a first machine learning model trained to output predicted future distance points of the person based on past expenditure data of the person and the number of distance points, wherein the first machine learning model is a supervised learning model trained using sample transaction data and corresponding sample future distance points;
providing the past expenditure data of the person and the number of distance points as inputs to the first machine learning model;
receiving a first machine learning output comprising the predicted future distance points from the first machine learning model;
determining a plurality of predicted reachable locations based on the predicted future distance points, the plurality of predicted reachable locations comprising at least a subset of the plurality of journey possibilities correlated to the predicted future distance points;
storing the plurality of predicted reachable locations in a memory;

accessing a second machine learning model trained to output personal attributes of the person based on the past expenditure data of the person, wherein the second machine learning model is trained using one of a supervised or partially supervised sample expenditure data and associated sample personal attributes;

providing the past expenditure data of the person as an input to the second machine learning model;

receiving a second machine learning output comprising the personal attributes of the person;

identifying one or more future locations for the person based on the personal attributes;

identifying a subset of the predicted reachable locations that overlap the one or more future locations; and providing the subset of the reachable locations.

* * * * *